Feb. 24, 1931.　　G. H. PERKINS ET AL　　1,794,317
MACHINE FOR SPREADING BITUMINOUS MIXTURES
Filed Jan. 17, 1929　　7 Sheets-Sheet 3
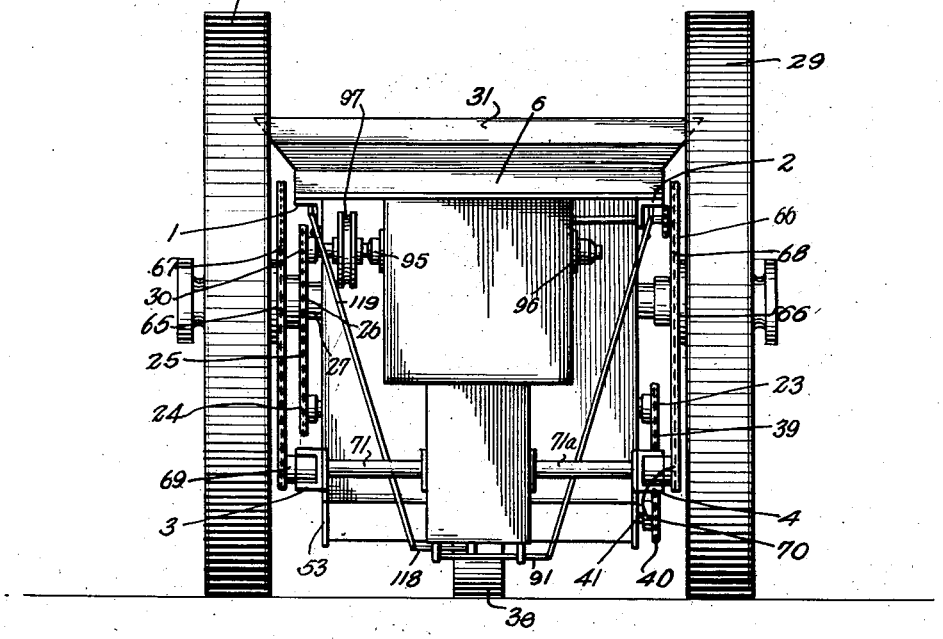
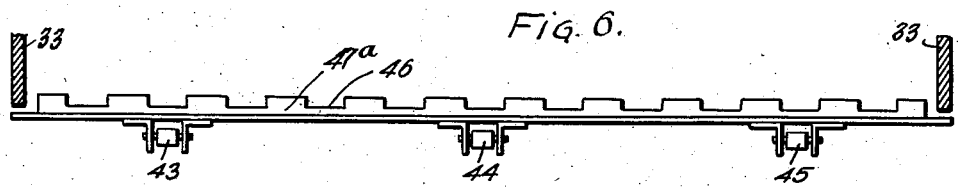
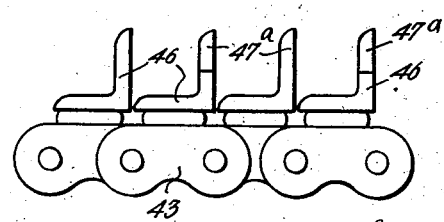

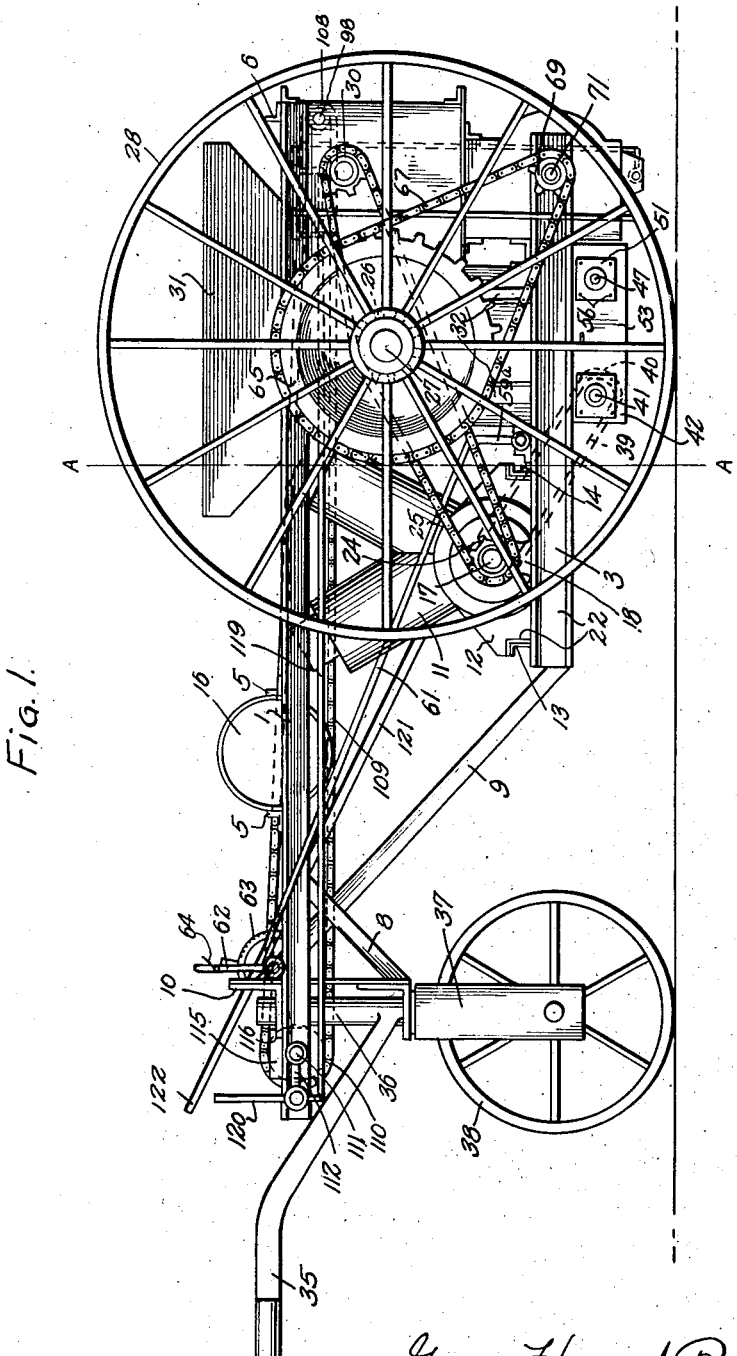

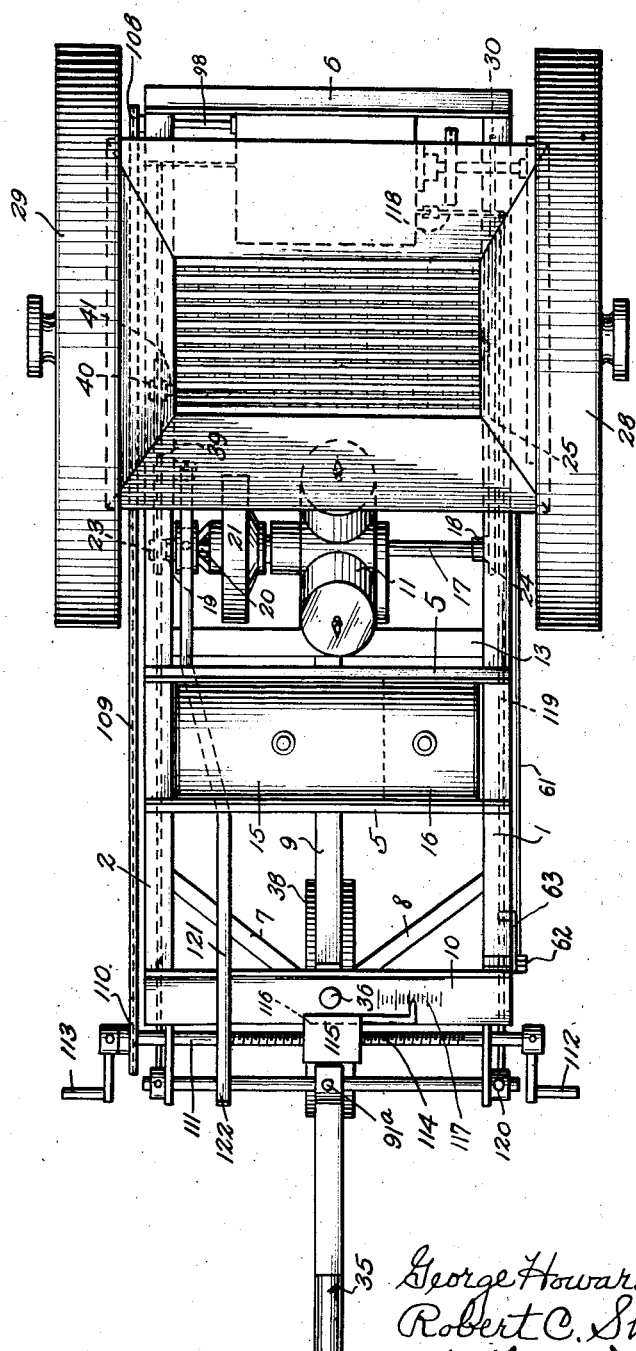

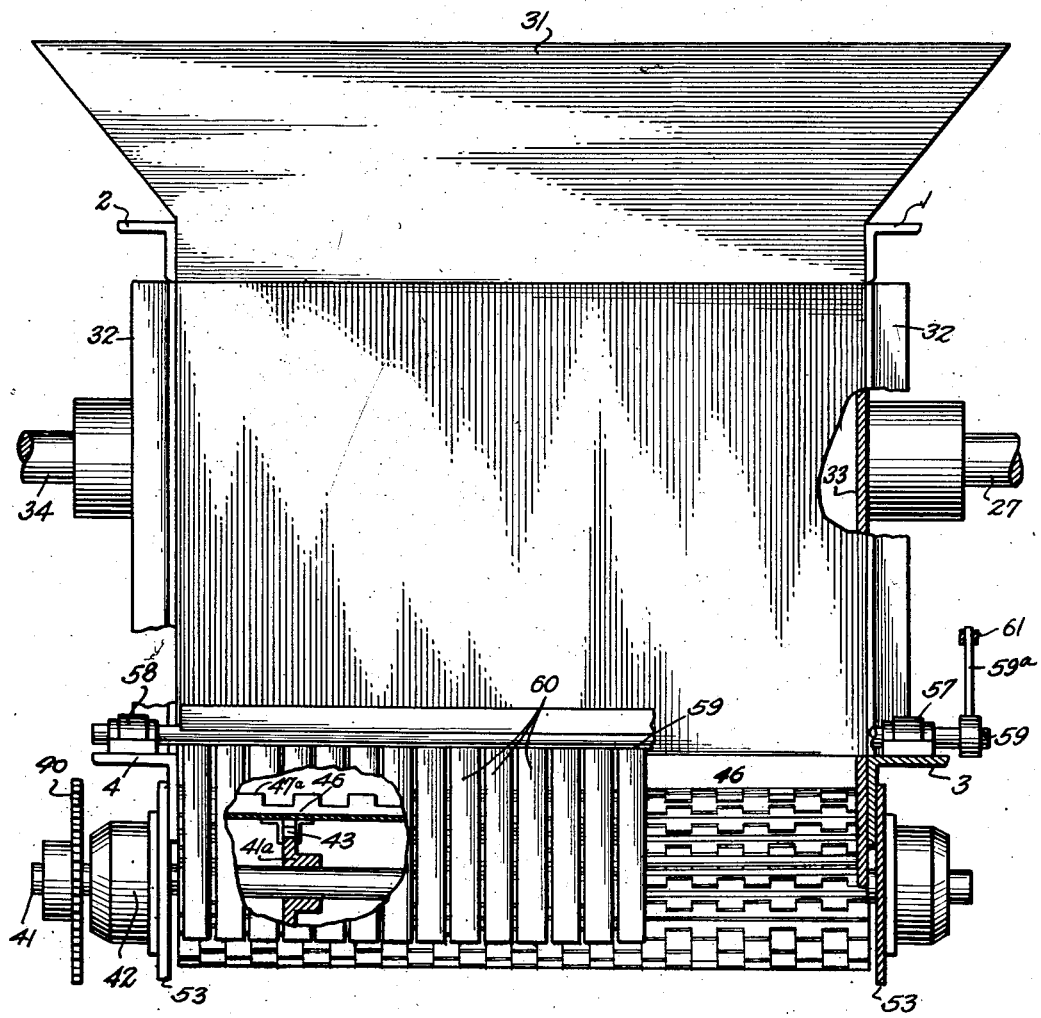

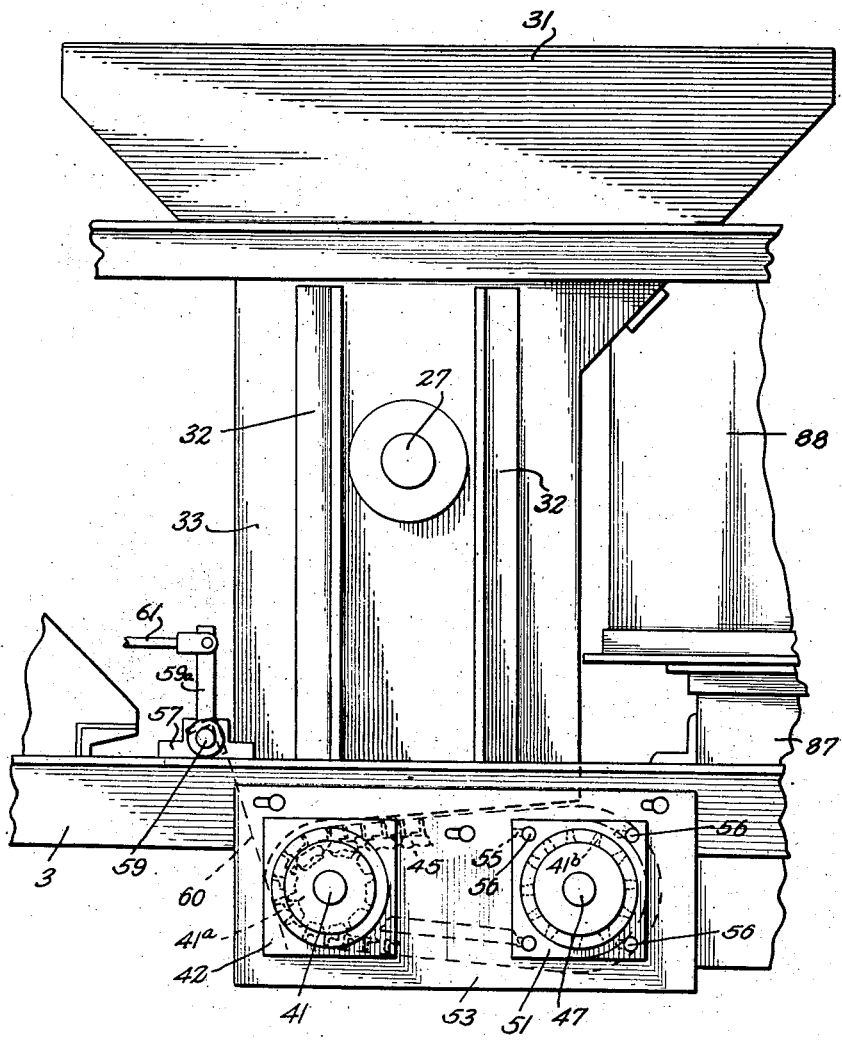

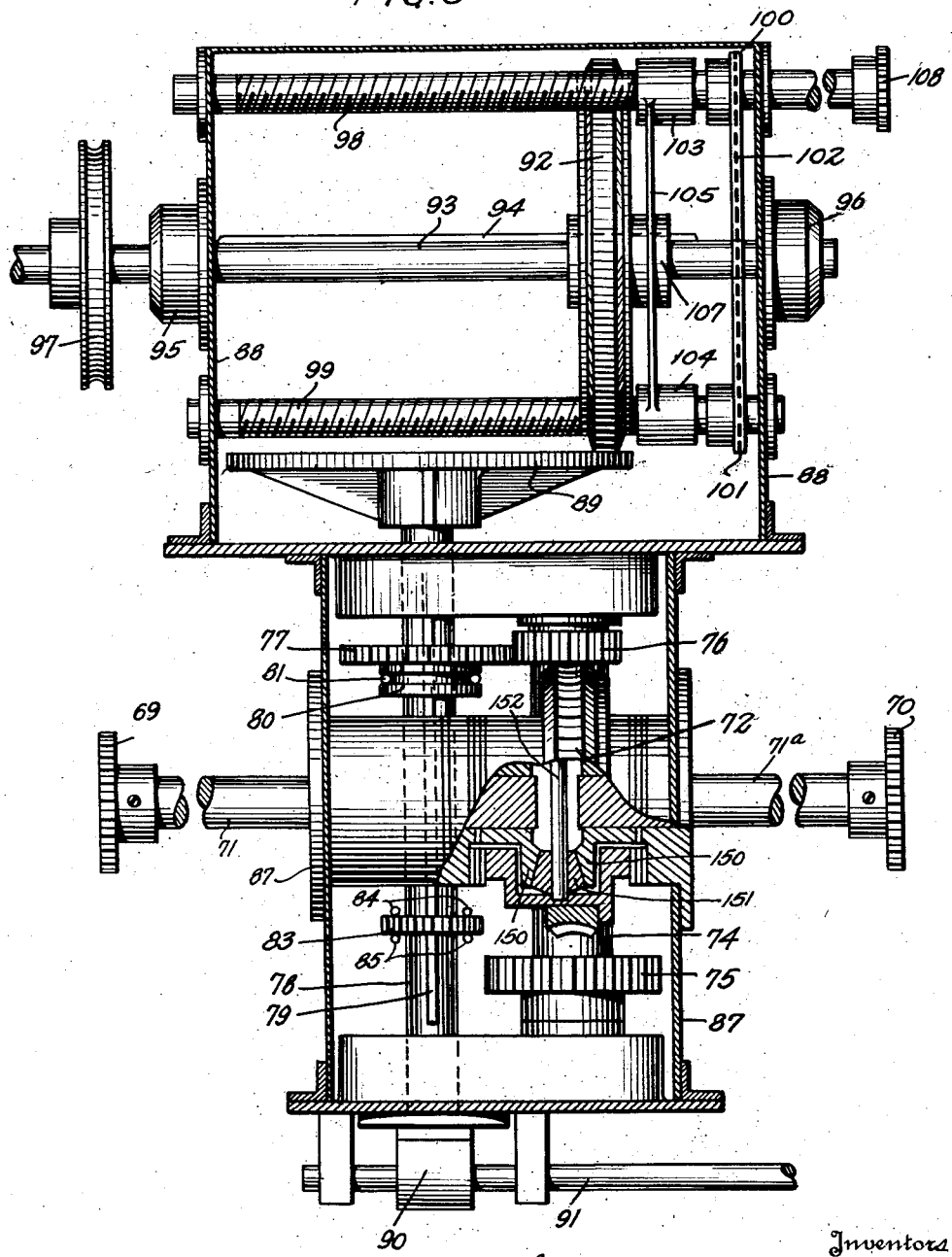

Feb. 24, 1931.  G. H. PERKINS ET AL  1,794,317
MACHINE FOR SPREADING BITUMINOUS MIXTURES
Filed Jan. 17, 1929   7 Sheets-Sheet 7

Inventors
George Howard Perkins
and Robert C. Shoemaker
By William W. Deane
their Attorney.

Patented Feb. 24, 1931

1,794,317

UNITED STATES PATENT OFFICE

GEORGE HOWARD PERKINS, OF CAMBRIDGE, MASSACHUSETTS, AND ROBERT C. SHOEMAKER, OF PHILADELPHIA, PENNSYLVANIA, ASSIGNORS TO WARREN BROTHERS COMPANY, OF CAMBRIDGE, MASSACHUSETTS, A CORPORATION OF WEST VIRGINIA

MACHINE FOR SPREADING BITUMINOUS MIXTURES

Application filed January 17, 1929. Serial No. 333,066.

This invention relates to movable machines for carrying, depositing and distributing bodies or mixtures of bituminous coated particles upon surfaces intended to receive the compound.

An object of this invention is to produce a machine comprising parts of special construction and arrangement which will spread a coherent mixture of adhesive bitumen coated particles in a layer of any desired depth and of any required consistency with respect to the denseness or looseness of the component coated particles of the layer.

Another object of this invention is to provide a machine capable of being moved or driven at a predetermined rate of speed over the receiving surface, and continuously depositing relatively separated portions of the mixture stated, in the form of a shower of particles.

Another object of this invention is to construct a machine which may be propelled at a given rate over the surface, and which may be caused to deposit the particles at a certain chosen rate independent of the movement of the machine as a whole. In other words the progressive movement of the machine may be conducted at one velocity of movement, and the depositing of the particles may be varied with regard to such movement. It is held to be within the purview of this invention to equip the machine with a driving motor for operating independently the translatory features involved in bearing the entire body of the mixture from point to point, and the disintegrating, distributing and depositing devices, or to actuate those devices by suitable connections with revolving members rotating when the machine is pushed or drawn along by hand.

According to the present practice bituminous mixtures used to lay the wearing surfaces of sidewalks, roadways or the like, or for waterproofing purposes, are ordinarily composed of mineral particles such as broken stone or sand coated with bituminous cement. As the function of the bituminous cement is to bind the particles together after the mixture has been spread and compacted, naturally it must be both cohesive and adhesive.

Consequently if such a mixture is subjected to even slight pressure it becomes coherent, due to the adhesion of the bituminous coated particles one to another. By reason of this characteristic it has not been practicable by any of the means ordinarily employed in the past to spread such a layer with uniform consistency. That is to say, the deposited layer will not consist throughout of portions having the same relative denseness or contiguity of the deposited particles, and when such a layer is compacted by the customary means of passing a heavy roller over its surface, the resulting compacted layer is not equally the same in compactness at all parts, but is more dense in some spots than in others.

In the past, the ordinary method has been to convey such a bituminous mixture from point of preparation, in suitable vehicles, to the point of use and there to deposit and spread it in a layer of approximately the depth desired by means of shovels and rakes operated by hand, or by some form of spreading machine. Thereafter the layer is compressed by means of a roller, and in places inaccessible to the roller by hand tamps or equivalent appliances. When the mixture is spread by hand with shovels and rakes, the object of the raking is to comb the bituminous mixture thoroughly with the tines of the rakes so that the resulting layer will be not only of uniform contour, with its surface at the desired level at all points, but also to leave it in a state of uniform compactness or of uniform looseness throughout its entire depth and superficial area. In many cases, however, it is impossible to thus overcome with raking the differences in compactness at all points, caused by the original deposition of the mixture in shovelfuls of various amounts striking the foundation at unequal velocities due to peculiarities in handling by particular individuals. It is believed obvious that a shovelful of the coherent and adherent mixture dropped in a single lump from the height of a foot or more will be thereby compacted to a greater degree than an equal depth of the same mixture which has been cast horizontally into place in the form of several superimposed thin layers of the material.

Substantially all of the mechanical spreaders used for this purpose up to the present date, operate upon the principle of depositing the mixture upon the foundation in piles or in long windrows in front of a screed or template held at a definite height above the foundation, so that when the screed moves forward it will push the top of the pile of mixture correspondingly, leaving behind the screed of template a layer of mixture of the desired depth and of uniform contour. This scraping action of the screed, however, does not to a sufficient extent equalize the variation of compaction existing in various parts of the pile or piles of mixture as originally deposited in front of the screed or template. In some instances the screed is given a short reciprocating motion laterally as it progresses forward, and while this action assists in cutting the way of the screed through the pile of mixture, it does not remove entirely the inequalities of compactness in the pile of mixture.

When a coherent bituminous mixture has been spread by either of the above methods and is then subjected to compression by rolling, the above mentioned inequalities of compactness of various portions of the layer are corrected more or less due to the kneading action of the roller, which causes the mixture to move horizontally back and forth to a slight extent. But the width of the face of the wheels of the roller is greater than the usual width of the spots where the mixture was deposited with little or no compaction, and as the compression by the roller continues the weight of the roller is carried more and more by adjacent spots which were compacted to a greater degree at the time of deposit, and when those spots have been compressed to the fullest measure of which they are capable, they are sufficiently stable to support the weight of the roller without further diminution of their thickness, so that it is impossible for the roller to deliver any further compaction to the less compacted spots, and while it is obvious that every portion of such a layer of bituminous mixture is of greater compactness after having been rolled than before, yet if the layer was non-uniform in compactness before rolling it will still be non-uniform in compactness after rolling. Possibly the difference in relative degrees of compactness of adjacent portions may be less than existed before rolling. But still there would be as many portions of the layer not compacted to the degree to which they are susceptible, and such portions remain relatively porous and permeable to water, thereby affecting the durability of such a mixture when used for waterprofing purposes.

If, immediately after completion, a street or roadway, paved with bituminous surface, applied in the manner just above set out, is subjected to traffic such partly compacted portions will be friable and will abrade rapidly in cold dry weather or even more rapidly if the weather is wet as well as cold, due to the absorption of water. If the weather is hot and dry such spots will compact to a lesser depth under the kneading action of the passing vehicle wheels which are naturally narrower than those of the roller. It is believed to be clear, therefore, that even though the bituminous surface may have been of true and even contour at the time rolling was completed, it will soon develop irregularities of contour, by reason either of abrasion or additional compaction by the traffic.

Another object of this invention is to produce a machine of the embodiment herein described which can be made small enough and balanced well enough to be manipulated by one man. In that connection it will be further understood that the laying of tracks or any other extraneous means for supporting the machine is not necessary.

In a co-pending application for Letters Patent of the United States Serial Number 326,863, filed on or about the 18th day of December, 1928, by George Howard Perkins one of the joint applicants for patent upon this present invention, is described and claimed the method of depositing such bituminous mixture in the form of a shower of individual coated particles, or relatively small pellets composed of a number of such bituminous coated fine particles.

The machine comprising this invention and the construction and arrangement of the parts thereof are illustrated in the accompanying drawings.

Figure 1 of the drawings represents a side view showing all parts assembled.

Figure 2 is a top view of the parts as set out in Figure 1.

Figure 3 is a rear view of the parts as shown in Figure 1.

Figure 4 is a view partly in section and partly in elevation on the plane of the line A—A of Figure 1 and shows the spring blades of which the gate is composed, and illustrates the position of the gate and the means of operating the gate to adjust it with respect to the disintegrator belt, the details of which are also set forth in this figure.

Figure 5 represents a side view of the parts illustrated in Figure 4, showing method of adjusting the gate and showing position of the sprocket wheels for driving the disintegrator belt; the position of the belt being also shown in dotted lines.

Figure 6 is a detail front view of one of the studded or castellated angle irons of which the disintegrator belt is constructed.

Figure 7 is a fragmentary side view of one of the chains carrying the angle irons of the disintegrator belt.

Figure 9:
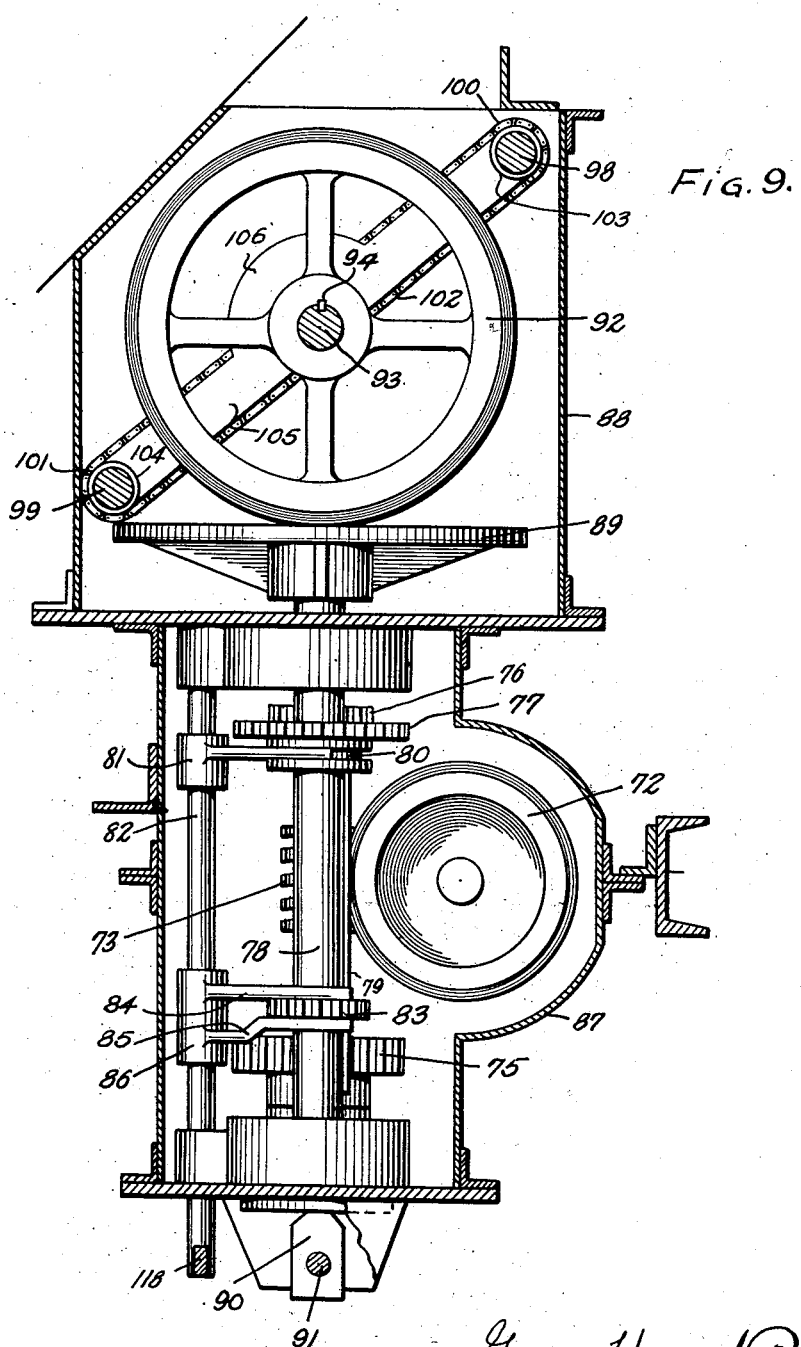

Figure 8 is a vertical section through the housing of the differential and change gears. The differential serves the same purpose as that unit in the rear axle of every automobile; namely to give the running wheels a differential movement to compensate for the difference in distance of travel between the inside and outside wheels when rounding a curve or turn. The change gears permit variations in speed at translation of the machine greater than what could be obtained with the use of the variable friction drive alone. This variable friction drive mechanism is also shown by the section of Figure 8.

Figure 9 is a vertical section of the $x$ $x$ housings illustrated in Figure 8, this section being taken in a plane at right angles to the plane of the section shown in Figure 8.

In Figures 4, 5, 6, 7, 8 and 9 the scale of drawing has been increased to render the illustrations of all related parts more clearly discernible.

Throughout the drawings and description the same number is used to refer to the same part.

Considering the drawings the frame of the machine consists of upper members 1 and 2 and lower members 3 and 4, joined together by the transverse members 5 and 6, with horizontally inclined bracing members 7, 8, and a middle member 9 upwardly and forwardly inclined to connect the lower frame members and a transverse member 10 which extends across the upper frame members at the front of the machine. It is held to be within the purview of this invention to construct the frame as such of any member, form, size and arrangement of members found suitable for the end desired.

A gasoline motor 11 is supported by its crank case 12 upon transverse members 13 and 14 on the lower frame members, and a gasoline tank 15 and oil tank 16 which are usually carried as shown in Figures 1 and 2 upon the transverse members joining the upper frame members. The motor 11 has its crank shaft 17 extending out both sides, being supported at the extremities by outboard bearings 18 and 19. The impeller clutch 20, of any selected description, the extra flywheel 21 and sprocket 23 are all mounted on one end of the crank shaft, and sprocket 24, referred to below, is mounted on the other end of the crank shaft. These are particularities of machine construction that may obviously be varied in accordance with the views of different makers. In Figure 2 it will be noticed that the drive sprocket 23 at the outer end of the crank shaft 17 is arranged outwardly or beyond the impeller clutch 20 on said shaft. Therefore, the sprocket 23 may be connected and disconnected with the shaft 17 by operating the clutch 20. From the sprocket 23 a chain 39 leads to a driving sprocket 40 on the outer end of a transverse shaft 41 carried in bearings such as the bearings 42 arranged below the lower frame member and supported thereby, as shown in Figure 4. On the shaft 41 are fixed a number of sprockets 41—a, one only being shown by Figure 4, their locations being set out in Figure 6. There are usually three of these sprockets spaced apart so as to give equal load to each of the three chains 43, 44 and 45 which are carried on the respective sprockets. The chains carry across them, a number of angle irons 46 having spaced projections or lugs 47a. These angle irons are closely enough arranged on the chains to define particle receiving troughs and are usually disposed in such a manner that the lugs will be in staggered relation. It will be understood that the chains 43, 44 and 45 are continuous and are carried by suitable sprocket wheels 41—a and 41—b on parallel transverse shafts 41 and 47. The shaft 41 is driven from the engine by chain 39, as explained above. Shaft 47 is free to turn as it is pulled by chains 43, 44, and 45 which are parts of the impeller. As customarily constructed, the bearings 51 and 42 for the shafts 41 and 47 are carried on plates 53 attached outwardly to the lower frame members as illustrated in Figures 4 and 5. Bearings 51 and 42 are provided with slots 55 and screws 56, such as shown in Figure 5, in order that any slack in the drive chain 39 or the belt chains 43, 44, and 45 may be taken up. This invention is in no sense restricted to the particular means illustrated for supporting and adjusting the transverse shafts 41 and 47.

Sprocket 24 on the crank shaft 17 drives the sprocket 30 of the transmission unit through the chain 25 which is carried over main wheel spindle 27 by idler sprocket 26. The broad tired wheel of spindle 27 is numbered 28 and its fellow is numbered 29.

As best shown in Figures 3, 4 and 5, each end 33 of the hopper 31 is an integral part of the frame forming a web which connects the upper frame member 1 or 2 with the lower frame member 3 or 4. Each web also carries a spindle 27 or 34 and is reinforced by upright members 32. It will be observed in Figure 3 that the top part of the hopper projects inside and below the broad tires of wheels 28 and 29 to protect the mechanism from spilled material.

In Figures 1 and 2 there will be observed at the front of the machine a steering tiller 35, which is connected with the vertical revoluble shaft or stem 36 of a fork support 37 that straddles the steering wheel 38 by which the machine may be guided in any desired direction.

In Figure 4, at the sides of the hopper 31 upon the lower frame members will be noted the bearings 57 and 58 carrying a transverse shaft 59 having a crank arm 59—a at one end by which the shaft may be turned. Side by side on the shaft are the depending spring blades or fingers 60, and these spring steel gate members will deflect singly to permit large stones and other extraneous material to pass without interfering with the operation. By moving the crank arm the associated spring blades may be moved towards or away from the forward turn of the disintegrator belt as described as the belt runs over its forward sprockets 41a. In Figure 5 there is shown the operating rod 61 pivotally attached to the crank arm 59a, and leading to the forward portion of the machine. The rod may be worked longitudinally by the lever 62 shown in Figure 1, to locate the gate at any desired distance from the forward turn of the disintegrator belt, the lever 62 may be arranged adjacent to a toothed arc 63 and equipped with a hand operated detent device 64 all of common construction and action.

As best illustrated in Figures 1 and 3, the main wheels 28 and 29 are provided on the inside, attached to the hubs of the wheels, with the large sprocket wheels 65 and 66, about which and engaged therewith are the chains 67 and 68 leading to and engaging the smaller sprocket wheels 69 and 70 best shown in Figure 8 which can be detachably secured to the ends of the transverse differential drive shaft 71 and 71a. The shafts 71 and 71a carry the mating gears 150 of a small automobile differential assembly of which worm wheel 72 is the ring gear. These mating gears are differentially driven by the spider gears 151 which are carried by the spider 152 which in turn is made to rotate in a plane perpendicular to shafts 71 and 71a by the worm ring gear to which the spider is attached.

Worm ring gear 72 meshes with a worm 73 (Fig. 9) on a vertical shaft 74 of the transmission assembly. The vertical shaft 74 carries the relatively larger gear wheel 75 at the lower end and a smaller gear 76 at the upper end next to the journals of the shaft. The smaller gear 76 is shown in mesh with a larger gear 77 which may be shifted up and down on a vertical shaft 78 and in engagement with a longitudinal spline 79 on the shaft. The larger gear 77 has a grooved collar 80 also in engagement with the spline, and as best set out in Figure 8 an operating fork 81 carried by the suitably supported reciprocating shift rod 82 engages the grooved collar. If the rod 82 is moved up and down the gear 77 will be engaged and disengaged with the small gear 76 on the worm-carrying shaft 74. When the gear 77 is disengaged by being moved downwardly, a smaller gear 83 also splined on the shaft 78 and movable up and down thereon, will be alternately brought into and out of engagement with the relatively larger gear wheel 75 at the lower end of the vertical shaft 74 of the transmission mechanism. To move the smaller gear up and down and to effect its engagement and disengagement as stated, a pair of jaws 84 and 85 are arranged one above and one below the gear 83. The jaws have a common hub or sleeve 86 fixed on the shift rod 82. The arrangement of the parts of the transmission assembly as illustrated is set for the higher speed ratio, approximately one to two and one-half through the gears 77 and 76 and the ring gear 72 will be revolved and will correspondingly drive the main wheels 28 and 29 by the agency of the sprocket wheels 69 and 70, the chains 67 and 68 thereon and the large wheel sprockets 65 and 66 as will be readily understood. If the smaller gear 83 engages the relatively larger gear 75 on shaft 74, the worm wheel 72 is revolved correspondingly more slowly and turns the driving shafts 71 and 71a at like rate. The transmission assembly just described is customarily protected by a suitable case or housing 87.

The variable friction drive members now to be described are usually enclosed in a compartment 88 mounted upon the housing 87. A horizontally revoluble friction disc 89 is secured within the compartment 88 to the upper end of the splined vertical shaft 78. The splined shaft is movable up and down by means of a cam 90 pivotally mounted below the housing 87, and operated by means of the rod 91 leading through various cranks and push rods to the forward portion of the machine frame and controlled by the lever 91a shown in Figure 2. If the cam is turned so as to raise the spline shaft 78, the gears 77 and 83 thereon are not displaced, but the friction disk or wheel 89 in the compartment 88 is forced upwardly into contact with the vertical friction wheel 92 on the shaft 93 having the longitudinal spline 94 and arranged transversely through the compartment 88 and revoluble in the bearings 95 and 96 shown exteriorly on the walls of the compartment in Figure 8. The shaft 93 carries a starter pulley 97, about which a cord may be wound to start the motor when desired, and usually at its outer end the shaft 93 has fixed the sprocket 30 driven by the chain 25 from the sprocket wheel 24 on the motor shaft 17 as previously described. It may be stated here that that if the splined vertical shaft 78 be not raised by the cam, rod and lever provided for the purpose, the friction disc 89 and wheel 92 are not brought into contact and the machine is not moved as a whole in any direction. The vertical friction wheel 92 on shaft 93 has its hub in engagement with the spline 94 of that shaft, so that while the disk may be revolved by the shaft, it can be at the same time moved along the length of the shaft. The members provided for moving the wheel lengthwise on the shaft 93 comprise two screw rods 98 and 99 arranged parallel with each other, one near the top and one near the bottom of the compartment 88, the ends of the screw rods being journaled in the walls of the compartment. Within the compartment the screw rods are provided with small sprocket wheels 100 and 101 connected by the chain 102, and thereby caused to revolve in synchronism. On the rods and engaging the screw threads are the cylindrical nuts 103 and 104, and a bar plate 105 connects the nuts and has a slot and groove connection with a collar 107 forming a part of the center or hub of the vertical friction wheel 92. Therefore, as the cylindrical nuts 103 and 104 are moved in unison along the screws the vertical wheel 92 is given movement in like direction. In other words, the vertical wheel 92 is moved towards or from the center of the horizontal friction disk 89. In the manner or mode of operation common to such mechanism, when the wheel works on the edge of the disc they revolve at approximately similar speeds, but when the wheel 92 approaches the center of the horizontal disk 89 the latter is revolved at higher speed and transmits that speed to the differential assembly within ring gear 72 by way of the vertical splined shaft 78 and gearing mentioned. The uppermost screw rod 98 projects somewhat without the compartment 88 and has fixed thereon a small sprocket wheel 108. A chain 109 connects the sprocket 108 with a like sprocket wheel 110 on the transverse shaft 111 revoluble in suitable bearings at the forward part of the machine and which may be turned by hand cranks 112 and 113 at either end of the shaft. The shaft 111 and attached members are best shown in Figure 2. It will be noted in this figure that the shaft 111 has its middle portion provided with screw threads 114, and a traveller block 115 engages the threads. It will be understood that the shaft passes through the block, and the threaded middle portion of the shaft engages a correspondingly threaded opening in the block.

The block 115 has a rear side provided with a groove 116 and the groove engages the front edge of the transverse member 10 previously mentioned. The engagement of the groove and the member 10 prevents the block from turning, and when the shaft 111 is revolved by either crank 112 or 113 the block may be caused to travel on the shaft in the direction desired. In Figure 2 will likewise be observed a scale 117, and as the block moves along the shaft the leading corner of the block is moved along the scale. It is held to be within the scope of this invention to provide the block with a pointer or indicating mark at any suitable place, and to correlate the pointer and scale for the purpose intended, which is to enable the operator at the front of the machine to tell the position of the vertical friction wheel 92 with respect to the horizontal friction disk 89. When the traveller block 115 is in the middle position on the shaft 111, as it appears in Figure 2, it is directly in the path of the movement of the lever 91a mentioned as the operating lever for the connecting rod 91 leading to the cam 90 which raises and lowers the vertical spline shaft 78 to engage and disengage the friction disks. The middle position of the block 115 on the screw shaft 111 is arranged to be assumed when the vertical friction wheel 92 is nearest the center of the horizontal disk 89 and the driven parts would be driven by the motor connection most rapidly. It is not desirable that the two friction disks shall be placed in contact at this time, as a disarrangement of the mechanism might result. Therefore, it is necessary to move the traveller block 115 out of the way of the lever 91a before the lever can be thrown, and when the block has been thus moved the friction wheel 92 is positioned to drive on a disc radius great enough to be safe.

The remaining description concerns the devices for shifting the gears 77 and 83 on the vertical splined shaft 78 of the transmission assembly, and for operating the impeller or disintegrator belt clutch. As indicated in Figures 1 and 9 this shifting is accomplished by means of the elbow lever arm 118 pivotally mounted below the housing 87 and connected by the rod 119 leading to the hand lever 120 carried by the upper frame member at the front of the machine in convenient reach of the operator.

The impeller clutch 20 mentioned as located on the motor shaft 17, whereby the sprocket wheel 23 is connected and disconnected with the motor shaft, is operated by means of a rod 121 leading to the front portion of the machine frame and controlled by a hand lever 122 mounted usually in the position shown in Figure 2. When the clutch 20 is connected the chain 39 about the sprocket 23 drives the sprocket 40 and the disintegrator belt composed of the chains 43, 44 and 45, also the series of studded or lug-bearing irons 46 secured to said chains is correspondingly driven.

To adequately explain the operation of this invention in respect to the objects desired to be attained, the following may be given regarding the customary use of the machine.

Changing the speed of the disintegrator belt or impeller, alters the discharge of the machine to a certain extent, but the limits of practical variation are not far enough apart to be of great value in controlling the quantity deposited to the unit of area. The statements here recited are in the main based upon actual experience with a machine which has been built and operated for some time. The best speed of the impeller seems to be about 900 R. P. M. of the 2½ inch sprockets at the forward turn of the impeller. As the speed increases above the stated velocity there does not seem to be enough time for the disintegrator belt to load properly. On the other hand, as the speed falls beyow 900 R. P. M. the centrifugal force is cut down and the belt becomes clogged with material.

With reference to opening the gate comprised of the spring blades described, it is found to increase the discharge of the machine up to a certain point, but thereafter it was ascertained that this opening reduced the quality of the spreading, rendering the spread material less even and not as loose in character as required for the best results. Therefore, this consideration discourages the use of that means of regulating the quantity as the only means of so doing.

It is learned by experiment and trial of the machine, that changes in temperature and make-up of the mixture to be spread have a very great bearing on the discharge of the impeller belt, but it is not always possible to control such conditions, which must be counteracted rather than utilized as a method of discharge regulation.

With the machine discharging any given amount of material per second, it is obvious that the speed of translation of the machine as a whole has a direct and controllable effect on the number of pounds spread to the unit of area of the receiving surface or foundation. In view of the facts and results determined and set out above, it has been decided that the most effective mode of operation is to hold the speed of the impeller or disintegrator belt at its most efficient velocity, and to maintain the spring gate closed into its most effective position, and to vary only the speed of translation of the machine as a whole to counteract disadvantage due to different conditions and peculiarities of the mixtures, in order that the depositing of the material may comply with various required thicknesses of the same.

With particular relation to locomotion or moving the machine as a whole over the ground it is learned from experience that it is probably best to have a minimum spreading speed, that is to say, speed of locomotion of the machine as a whole, of three-fourths of a foot each second and a maximum travel of two feet in each second. As the impeller belt requires about ten horsepower and locomotion only demands a maximum of four horsepower, it is found advantageous to drive the belt direct from the engine, and have a variable speed ratio between the engine or motor and the main wheels. This variable ratio can best be obtained with a friction transmission of the general type shown in the drawings accompanying this application. The advantage of this form of power transmission is that it combines the features and operation of a clutch, speed changing device and reverse mechanism. It may be here noted that the highest spreading speed stated above is two feet in each second. That is the limit of speed obtainable with the friction transmission alone. It will give ratios from one to one, to about one to three. To get a satisfactory speed of translation, for going to and from the loading pile, it is found necessary to introduce a set of change gears as set forth in the drawings. With the gears set for high speed, the machine may be moved over the ground at a maximum speed of approximately fourteen feet in each second, or any translatory speed below that. This movement would not be practicable without the change gears as set forth. The friction disk and wheel of the transmission are run at a high speed to keep the torque low, thereby permitting them to be comparatively small. To help reduce from this high speed to the moderate speed of the main wheels, a worm and worm gear are employed the latter taking place of the ring gear usually found in small automobile differential assemblies, and as in the automobile it drives a set of spider gears 151 which in turn drive the mating gear 150 and axles 71 and 71a. This differential unit is necessary to make it easy to guide the machine around corners.

It is the practice in the operation of this invention, to provide the engine with a governor of any suitable construction which will keep the motor going at a constant no load speed of 1900 R. P. M. and a constant full load speed of 1700 R. P. M. with no manipulation on the part of the attendant. It is also learned in the service of this machine that an extra flywheel as illustrated in the drawings herewith is of advantage in starting operation. When the engine is idling as when the machine is being loaded or when the whole is to be moved from place to place the engine speed is controlled by the usual hand throttle and it is held to be within the choice of the applicant to introduce any known valve construction for the purpose and to connect the same by suitable rod or cord means with an operating lever or handle mounted conveniently on the guiding tiller already mentioned.

What is claimed is:—

1. Apparatus for spreading bituminous mixtures consisting of stone particles of which each is covered with bitumen, the same comprising a hopper for the reception of the mixture in bulk, and a disintegrator movable with respect to the hopper and disposed in contact with the contents thereof, the disintegrator comprising a continuous series of closely related members defining troughs of a width sufficient to permit particles of the mixture to be received in them.

2. Apparatus for spreading bituminous mixtures consisting of stone particles of which each is covered with bitumen, the same comprising a hopper for the reception of the mixture in bulk, and a disintegrator movable transversely of the hopper and disposed in contact with the contents thereof, the disintegrator comprising a continuous series of closely spaced transverse bars, and chains which the bars span and by which the latter are driven, the bars consisting of angles of which one flange is secured to the chains.

3. Apparatus for spreading bituminous mixtures consisting of stone particles of which each is covered with bitumen, the same comprising a hopper for the reception of the mixture in bulk, and a disintegrator movable with respect to the hopper and disposed in contact with the contents thereof, the disintegrator comprising a series of particle receiving troughs and means for scraping the particles from the bulk.

4. Apparatus for spreading bituminous mixtures consisting of stone particles of which each is covered with bitumen, the same comprising a hopper for the reception of the mixture in bulk, and a disintegrator movable transversely of the hopper and constituting the bottom thereof, the disintegrator comprising a series of power driven chains and angle bars spanning and having one flange secured to the chains, said angle bars being arranged in close relation to provide a relatively close spacing of the remaining flanges which are slotted to form lugs so that the latter may engage the lowermost surface of the mixture and reduce it to separated particles.

5. Apparatus for spreading bituminous mixtures consisting of stone particles of which each is covered with bitumen, the same comprising a hopper for the reception of the mixture in bulk, a disintegrator movable with respect to the hopper and constituting the bottom thereof, the disintegrator comprising a continuous series of particle receiving troughs and means for scraping the particles from the bulk, and a deflecting member against which the particles are thrown from said troughs.

6. Apparatus for spreading bituminous mixtures consisting of stone particles of which each is covered with bitumen, the same comprising a hopper for the reception of the mixture in bulk, a disintegrator movable transversely of the hopper and disposed in contact with the contents thereof, the disintegrator comprising a continuous series of closely related members having upstanding projections which engage the surface of the mixture and receive between them the separated particles which are discharged at one side of the hopper while in separated condition, and a gate disposed at the discharge end of the disintegrator for deflecting the particles downwardly, the gate being disposed at a considerable angle with respect to the plane of the disintegrator.

7. Apparatus for spreading bituminous mixtures consisting of stone particles of which each is covered with bitumen, the same comprising a hopper for the reception of the mixture in bulk, and a disintegrator movable transversely of the hopper and disposed in contact with the contents thereof, the disintegrator comprising a continuous series of closely related members having upstanding projections which engage the surface of the mixture and receive between them the separated particles which are discharged at one side of the hopper while in separated condition, and a gate disposed at the discharge end of the disintegrator for deflecting the particles downwardly, the gate being disposed at a considerable angle with respect to the plane of the disintegrator and comprising a series of resilient fingers individually yieldable to particles larger than the average.

8. Apparatus for spreading bituminous mixtures consisting of stone particles of which each is covered with bitumen, the same comprising a hopper for the reception of the mixture in bulk, and a disintegrator movable transversely of the hopper and constituting the bottom thereof, the disintegrator comprising a series of power driven chains and transverse bars spanning and secured to the chains and formed with spaced upstanding projections of which those on one bar are staggered with respect to those on the succeeding bar, said projections engaging the lowermost surface of the mixture to reduce it to separated particles.

In testimony whereof we affix our signatures.

GEORGE HOWARD PERKINS.
ROBERT C. SHOEMAKER.